United States Patent [19]

McCarthy

[11] 4,269,150

[45] May 26, 1981

[54] DOG LEASH

[76] Inventor: Michael D. McCarthy, 1065 Huntingdon Dr., San Jose, Calif. 95129

[21] Appl. No.: 80,242

[22] Filed: Oct. 1, 1979

[51] Int. Cl.³ .............................................. A01K 27/00
[52] U.S. Cl. ..................................................... 119/109
[58] Field of Search ................... 119/109; 242/107.4 R

[56] References Cited

U.S. PATENT DOCUMENTS

| | | | |
|---|---|---|---|
| 1,016,493 | 2/1912 | Hackney | 242/107.4 R |
| 2,222,409 | 11/1940 | Gottlieb | 119/109 |
| 2,250,171 | 7/1941 | Wilkins | 119/109 |
| 2,647,703 | 8/1953 | Hayes | 242/107.4 R |

Primary Examiner—Jay N. Eskovitz
Attorney, Agent, or Firm—Blair, Brown & Kreten

[57] ABSTRACT

Disclosed herein is a retractable leash device in which the leash cable, which is wound on a spring-loaded spool, is threaded through the handgrip area of the casing before it exits the casing at an area remote from the handgrip. The handgrip is provided with a spring-loaded braking plate, so that squeezing the handgrip causes the teeth on the braking plate to engage and stop the leash cable. The leash cable can be freely payed out or retracted until the handgrip is squeezed by the operator, which stops the motion of the cable.

6 Claims, 3 Drawing Figures

U.S. Patent      May 26, 1981      4,269,150
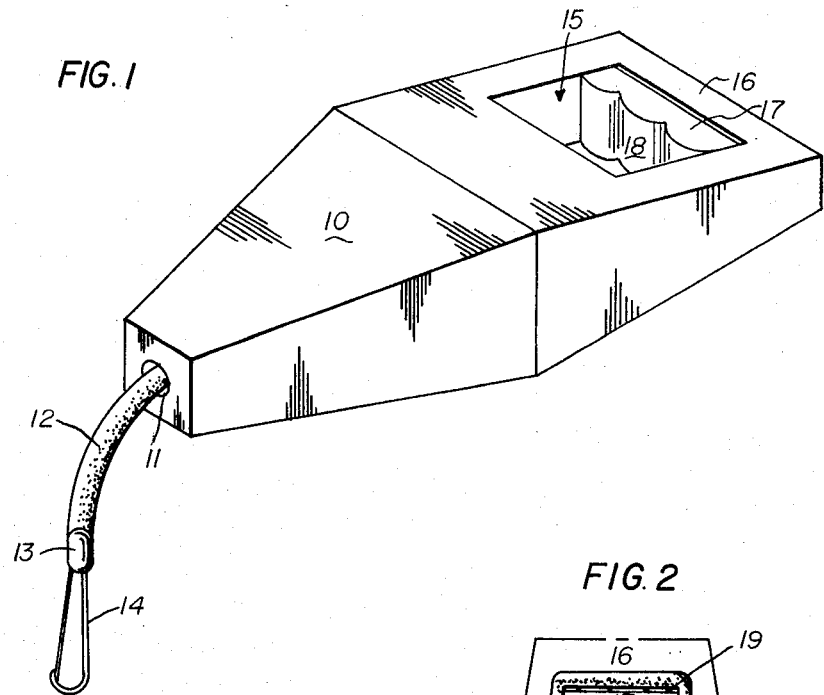
FIG. 1
FIG. 2
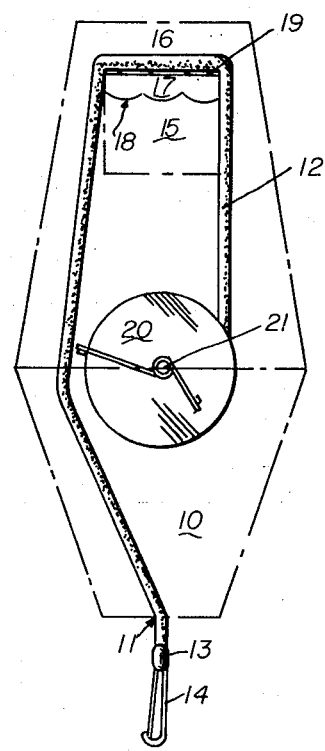
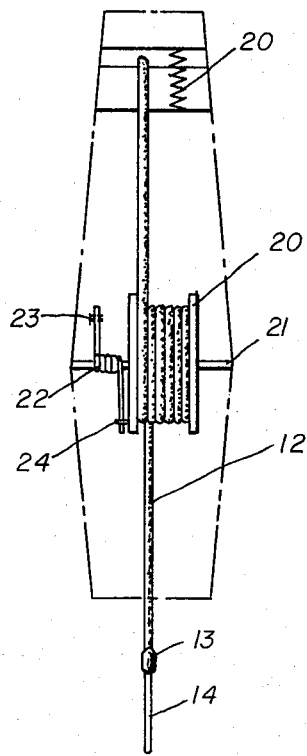
FIG. 3

DOG LEASH

BACKGROUND OF THE INVENTION

The present invention relates generally to leash devices, and specifically to retractable leash devices. This type of apparatus is well known in the prior art and the following references have been selected as germane to the patentability of the present invention:

U.S. Pat. Nos. 2,919,676—Schneider, 3,318,288—Mullritter, 3,853,283—Croce et al, 3,937,418—Critelli 4,018,189—Umphries et al.

All of the references cited utilize a spring in conjunction with a rewinding spool, as does the present invention; however, the features that would appear to distinguish one from another is the means used to actuate and control the paying out and retrieval of the leash. Likewise, the present invention is similarly distinguishable in that the control mechanism is a spring loaded braking plate integral with the hand grip, so that releasing pressure on the handgrip allows the leash to be paid out or retracted as desired.

When walking a dog or other pet, it is not uncommon for the animal to become excited by another dog, a passing automobile, or any other such stimulus, and in that event the animal may attempt to lurch forward and engage the focus of his attention. If the control means for the retractable leash is remote from the handgrip area, then controlling a sudden lurch by a tethered animal may be difficult because the operator must first locate then actuate the control mechanism, and during the intervening time the tethered animal may control the leash and not the operator. This problem is avoided in the present invention by providing a control mechanism integral with the handgrip so that any erratic motion by the tethered animal can be instantly controlled by squeezing the handgrip.

SUMMARY AND OBJECTS OF THE INVENTION

Accordingly, it is a primary object of the present invention to provide a retractable dog leash in which the mechanism that controls the paying-out and retrieval of the leash is integral to the handgrip. This is accomplished in the present invention by providing a hollow handgrip through which the leash passes and a toothed braking plate integral to the hollow handle, so that when the spring loaded braking plate is depressed the teeth on the braking plate extend into the interior of the handle and engage the leash preventing further motion of the leash in any direction.

Accordingly, it is a further object of the present invention to provide the hollow casing which contains the leash with an opening that forms a handgrip, so that the leash can be threaded through the handgrip area before leaving the hollow casing.

It is a further object of the present invention that the cutaway opening in the casing that forms the handgrip be located on the opposite end of the casing from the opening through which the leash extends. Thus any jerking motion on the leash tends to engage immediately the braking plate on the handgrip.

Other objects and advantages will become apparent in the following specification when considered in light of the attached drawings.

BRIEF DESCRIPTION OF THE DRAWINGS

FIG. 1 is a perspective view of the invention.

FIG. 2 is a top view showing the internal mechanism with the casing drawn in phantom.

FIG. 3 is a side view showing the internal mechanism with the body drawn in phantom.

DESCRIPTION OF THE PREFERRED EMBODIMENT

Referring now to the drawings in detail wherein like reference characters indicate like parts throughout the several figures, the reference numeral 10 refers generally to the hollow outer casing of the present device. The outer casing 10 is essentially shaped like two hollow truncated pyramids aligned base to base. The leash cable 12 emanates from an opening 11 at the forward extremity of the casing 10. The end of the leash cable 12 is provided with a snap clip 14 by means of which the leash may be attached to an animal and a stock bulb 13, which will not pass through the opening 11 so that a portion of the leash cable always remains on the exterior of the casing.

The opposite end of the casing 10 is provided with a large rectangular opening 15 which forms a handgrip area 16. The handgrip area 16 is further provided with a braking plate 17 which, when depressed, slides within the handgrip area 16 of the casing and interferes with the hollow channel therein. The interior base of the braking plate 17 is provided with a series of teeth 19, which engage and stop the leash cable 12 when the braking plate 17 is depressed. The opposite face 18 of the braking plate 17 is an undulating textured surface that provides a grip for the fingers of the operator. A return spring 20 returns the braking plate 17 to a position where the teeth 19 do not engage the leash cable 12.

The leash cable 12 is wound on a spool 20 contained within the casing 10. The spool 20 rotates on an axle 21 transversely mounted within the casing. A retracting spring 22 is mounted on the axle 21 in proximity to the spool 20. One extremity of the spring 22 is engaged by a stop peg 24 attached to the spool 20, while the other end of the spring is attached to a stop peg 23 mounted to the casing 10. Thus, unwinding the leash cable 12 from the spool 20 pre-loads the return spring 22, so that the leash cable 12 will rewind on the spool 20 when released. Before the leash cable 12 exits from the interior of the casing 10, it is threaded through the hollow channel of the handgrip area 16 and then proceeds to the opposite end of the casing and exits through the hole 11 provided therein. Thus the leash cable 12 travels through the handgrip area 16, and is subjected to being engaged by the braking plate 17, which controls the paying-out and retrieval of the leash cable 12.

Having thus described the preferred embodiment of the invention it should be understood that numerous structural modifications and adaptations may be resorted to without departing from the spirit of the invention.

What is claimed is:

1. A retractable dog leash comprising: a hollow casing having an opening therethrough at one end thereof, a portion of said casing adjacent said opening forming a handgrip area, a leash cable for an animal such as a dog, a shaft supported spool in said casing, a hole in said casing remote from said handgrip area through which said leash cable is threaded, said leash cable extending from said hole within said casing around said opening through said handgrip area and onto said shaft supported spool, spring means operatively connected to said spool to yieldingly retract said cable once said cable has been payed out, and manually activated braking means on said casing movable into braking engagement with the portion of said leash cable within said handgrip area in a direction opposite to the pulling direction of said animal on said cable.

2. A leash in accordance with claim 1 wherein said brake means includes a braking plate slidably disposed within said opening for gripping by the fingers of a user so that when said braking plate slides relative to said casing said braking means is actuatable for stopping said cable.

3. A leash in accordance with claim 2 wherein said first spring means comprises a first stop element disposed on an inner portion of said casing, a second stop element on said spool and a spring overlying said shaft and connected to said stop elements, whereby rotation of said spool to pay out said cable, tensions said spring.

4. A leash in accordance with claim 3 wherein the inner portion of said braking plate is provided with a plurality of teeth and wherein said casing portion forming said handgrip area includes a frame member on said casing with said cable portion disposed therein whereby squeezing of said braking plate and said casing portion presses said plurality of teeth into said cable portion against said frame member.

5. A leash in accordance with claim 4 including a spring disposed between said braking plate and said frame member for yieldingly moving said braking plate towards the other end of said casing.

6. A leash in accordance with claim 5 wherein said casing has a generally truncated, pyramid shaped, forward portion proximate to said hole, and a truncated, pyramid shaped, rearward portion juxtaposed to said forward portion with the bases of said forward and rearward portions in registry.

* * * * *